United States Patent [19]

Hudson

[11] Patent Number: 4,961,452

[45] Date of Patent: Oct. 9, 1990

[54] LOG SPLITTING APPARATUS

[76] Inventor: John L. Hudson, Rte. 1, Box 364, Florence, S.C. 29501

[21] Appl. No.: 346,692

[22] Filed: May 3, 1989

[51] Int. Cl.⁵ .............................................. B27L 7/00
[52] U.S. Cl. ................................ 144/193 A; 144/3 K; 144/193 E; 144/366
[58] Field of Search .............. 144/3 K, 193 R, 193 A, 144/193 E, 366

[56] References Cited

U.S. PATENT DOCUMENTS

| | | | |
|---|---|---|---|
| 3,974,867 | 8/1976 | Butas, Jr. | 144/193 A |
| 4,019,549 | 4/1977 | Williams | 144/193 A |
| 4,269,242 | 5/1981 | Smith et al. | 144/3 K |
| 4,294,295 | 10/1981 | Olin | 144/3 K |
| 4,371,019 | 2/1983 | Jeffrey | 144/3 K |
| 4,373,564 | 2/1983 | Heikkinen | 144/3 K |

Primary Examiner—W. Donald Bray
Attorney, Agent, or Firm—Dority & Manning

[57] ABSTRACT

A log splitting apparatus is provided with a sensing mechanism arranged with adjustment linkages to vary the position of a cutter blade in accordance with the sensed diameter of a given log to-be-split. A sensing wheel is arranged to ride on the side of the log, and is mounted on a pivotable arm operatively connected to the cutter blade. The pivotable arm is connected to mechanical linkages so as to automatically position a cutter assembly for producing the splitting of logs substantially in half. An optional multi-blade cutter assembly produces quartering of a log during a single log feeding operation.

16 Claims, 3 Drawing Sheets

LOG SPLITTING APPARATUS

BACKGROUND OF THE INVENTION

The present invention relates generally to improved log splitting apparatus, and more particularly to log splitters which will provide the capability for selectively effecting the automatic splitting of logs in half, or for improved quartering of logs generally.

In conventional log splitting apparatus, particularly of the types which are mobile and adapted to be trailed by vehicle to a log splitting site, the apparatus includes power driving means arranged to ram the log along a bed frame and into engagement with a blade or blades for splitting the logs as the power driving means continues its full movement. If logs previously cut in half need to be cut again for quartering, the operation of the log splitting apparatus must be repeated. In other words, the power driving drive means is retracted, the half-log is placed back on the bed frame in a repeat operation which produces the splitting in half again of such half-log. The other half-log must be likewise treated. Therefore, in order to effect quartering of a log with such typical conventional apparatus, three operations of the log splitting apparatus must be enacted.

In such conventional machines, there is also no provision for automatically determining the diameter of a log and for producing automatic re-positioning of the cutter blade in accordance with such diameter. In cutting a grouping of logs comprising small diameter logs mixed with relatively larger diameter logs, the operator must reposition the blade and/or perhaps the bed frame to adjust for differences in log diameters.

All of the foregoing constructions require considerable time and effort to effect the desired and/or necessary positioning and adjusting, or quartering operations.

SUMMARY OF THE INVENTION

In order to address and overcome such disadvantages and inefficiencies of conventional log splitting devices, the present invention provides novel arrangements of cutting blades for a log splitting apparatus, and, independent thereof, permits automatic positioning of a cutter blade assembly in accordance with the diameter of logs to-be-split, without the need of operator intervention or even operator attention to such consideration.

Broadly, it is the purpose of this invention to provide improved log splitting apparatus. Therefore, it is one general object of the present invention to improve log splitting apparatus by incorporating therein means for adjusting a blade in accordance with the diameter of a log to-be-split. More specifically, it is an object to provide for such manner of adjustment to occur automatically during the course of log splitting operations, as logs of different diameters are presented.

Another general object of the present invention is to accomplish quartering of a log in a single log splitting operation, even without the intervention of an operator.

Still another present object is to enhance the capability of a log splitting apparatus by provision of a feature which enables the selective production of logs split in half or quartered.

Still another more particular object of the present invention is to enhance the cutter blade assembly for a log splitting apparatus by arranging four cutter blades in mutually perpendicular fashion, and optionally with offset cutting edges.

Yet another object is to provide improved log splitting apparatus advantageously incorporating all of the foregoing improvements and desired features combined in a single construction (though separately operable in accordance with various aspects of this invention).

In one exemplary preferred embodiment, the present invention includes a cutter blade assembly comprising four blade sections arranged 90° from one another, and in a common plane addressing an approaching log to-be-split. In such arrangement, upon driving of a log into the blade assembly, the log is quartered during a single simple operation. Such novel blade assembly may be preferably arranged so that one or more blades are offset from each other in the direction of movement of the log, thereby advantageously reducing the initial strain on the drive system for the apparatus.

Another separate aspect of the invention is the provision of a sensing or indexing mechanism operatively associated with a cutter blade assembly for raising or lowering such assembly in accordance with detected (i.e., sensed) diameters of logs to-be-split with the apparatus. Adjusting devices may be provided to insure that the center point of the cutter blade assembly, from which the blade sections are preferably arranged in a radial orientation, is centered with respect to the end of a log to-be-split, regardless of the diameter of the log. The sensing mechanism of the present invention may also be arranged so that in the event that only single split logs are desired (that is, only cut into two pieces), the cutter blade assembly may be actuated so that only vertically arranged blade sections are activated or provided for the log splitting operation.

The present invention is intended to be practiced by those of ordinary skill in the art with various readily apparent modifications, variations, reversal of parts, and substitution of equivalents as such persons may desire, or as may be indicated by the circumstances and limiting criteria of a particular application. All of the foregoing variations are intended to come within the spirit and scope of this invention by virtue of present reference thereto.

Additionally, different embodiments of the present invention may include various combinations of presently disclosed features and aspects of this invention. One such exemplary presently preferred embodiment is directed to a log splitting apparatus, comprising log bed means upon which logs to-be-split are supported for being moved therealong; power ramming means for driving a log along the log bed means toward a log splitting station to be split thereat; a sensing mechanism, situated adjacent the log splitting station, for sensing a log being driven towards the station and responsively assuming an indexed position in accordance with the sensed diameter of such log; a cutter blade assembly arranged at the log splitting station in the path of movement of a log for splitting such log as the same is driven against the cutter blade assembly by the power ramming means; and automatic blade adjustment means, associated with the sensing mechanism and the cutter blade assembly, for selectively positioning the cutter blade assembly relative said log bed means in accordance with the indexed position assumed for a given log, thereby automatically controlling the relative position of the cutter blade assembly in accordance with the sensed diameter of such given log.

Another exemplary present construction concerns a log splitting apparatus, having a log bed upon which logs to-be-split are supported for movement in an established direction therealong, power ramming means for driving a log along the log bed and towards a log splitting station to be split thereat, and splitter means arranged at the log splitting station, for splitting logs driven theretowards by the power ramming means, wherein such splitter means includes one pair of splitting blade sections arranged generally in a horizontal orientation; and another pair of splitting blade sections arranged generally in a vertical orientation, whereby logs being driven against such blade sections by the power ramming means are cut into four pieces.

Still another present exemplary embodiment comprises a log splitting apparatus having a log bed upon which logs to-be-split are supported; a power ramming device for driving a log along the log bed and towards a log splitting station to be split thereat; a cutter blade assembly situated at the log splitting station and having plural blade sections for cutting into four separate pieces a log driven thereagainst by the power ramming device; and adjustment means for automatically moving the cutter blade assembly so as to position the blade sections relative the path of movement of a given log, based on the sensed diameter of such given log, so as to effect splitting of such given log substantially in quarters.

Other objects, advantages, and aspects of the invention will become apparent after reading the following description taken in conjunction with the drawings discussed below.

BRIEF DESCRIPTION OF THE DRAWINGS

A full and enabling disclosure of the present invention, including the best mode thereof, directed to one of ordinary skill in the art is set forth in the following specification, including reference to the accompanying drawings, in which.

Figure 1:
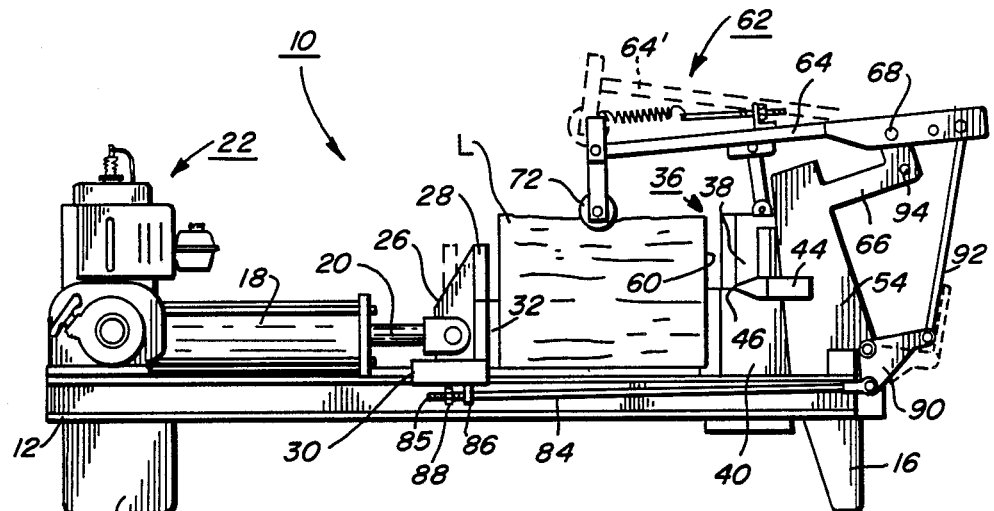
FIG. 1 is a side elevational view of an exemplary log splitting apparatus in accordance with the present invention.

Repeat use of reference characters in the following specification and accompanying figures is intended to represent same or analogous features or elements thereof.

DETAILED DESCRIPTION OF PREFERRED EMBODIMENT

The log splitting apparatus generally indicated by reference numeral 10 as variously shown in the figures preferably includes a bed frame 12 supported by suitable piers or legs 14 and 16. It will be understood that the bed frame 12 may also be supported on a trailer or other accessory to a vehicle, having wheels, sleds, or the like for movement of the log splitting apparatus to a log splitting site.

At one end of bed frame 12 there is shown a representative power drive or ramming means 18 in the form of a hydraulic ram having a piston rod 20 adapted for actuation between either a retracted or an extended position, with movement thereof parallel to the plane of bed frame 12. As well understood by those of ordinary skill in the art, hydraulic fluid may be introduced into ram 18 by a suitable internal combustion machine and fluid pump unit, all generally indicated by reference numeral 22. The ram 18 and engine/pump unit 22 enable log splitting apparatus 10 to be easily transported and operated in remote areas, without the need of external power sources. It also will be understood that other forms of power driving or ramming means may be substituted for the disclosed arrangement. For example, an electric motor may be used to rotate and drive a worm gear or similar arrangement.

The outer or free end of piston rod 20 has secured thereto a log engaging pad member 26 which includes a vertical back-up plate 28 secured at its base to a horizontal member 30. Another member 32 is also secured to the lower edge of vertical member 28 and is arranged to contact a log, generally L, to-be-split. As shown in FIG. 1, back-up plate 28 is set back slightly from log contacting member 32 to ensure complete log-splitting in the event the upper half of the log separates from the lower half before splitting operation is completed. During retraction and extension operations of ram 18 or an equivalent structure, pad member 26 and its associated structure will be moved horizontally along bed frame 12 in either of the selected directions, thereby also establishing a corresponding direction of log movement.

Figure 3:
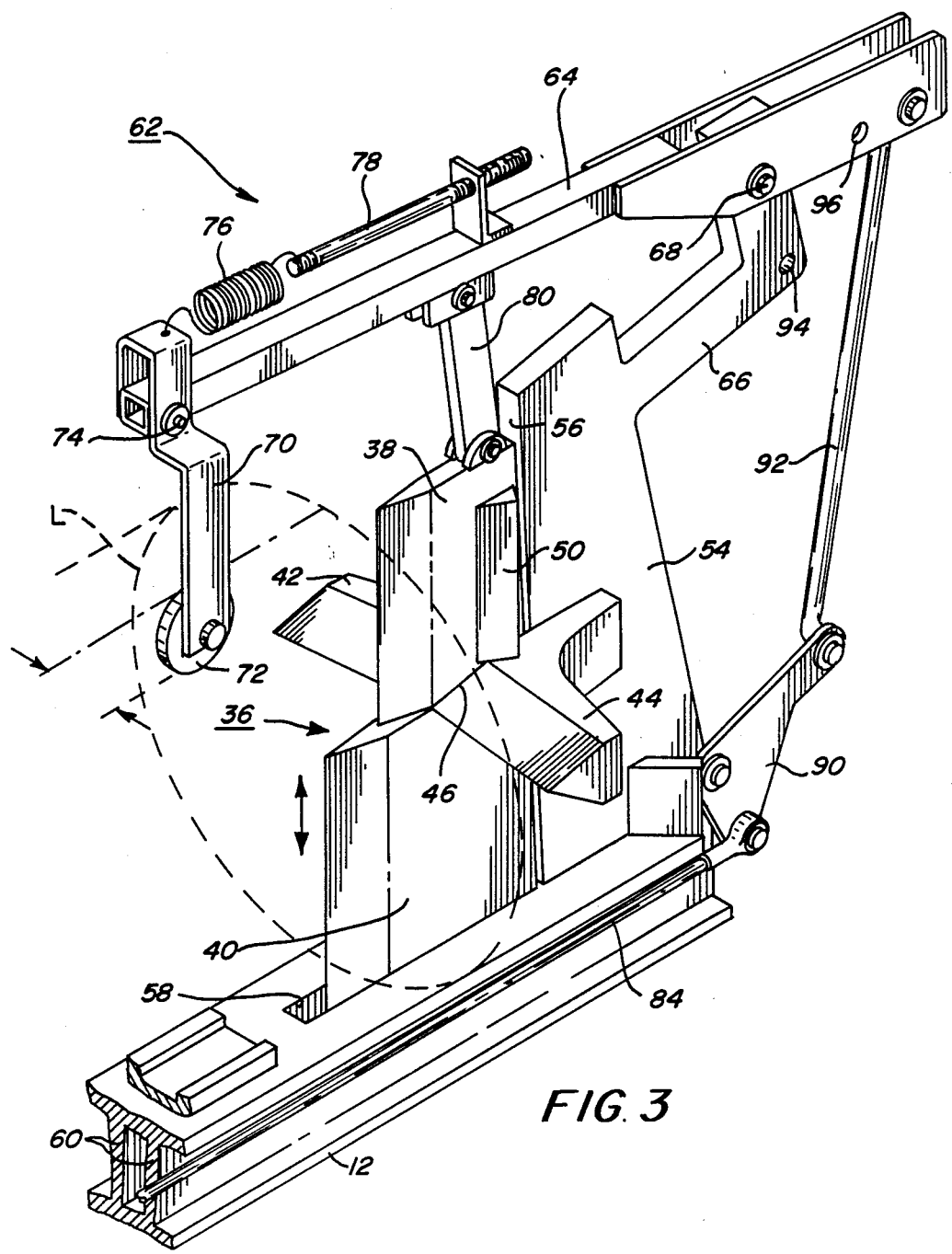
FIG. 3 is an isometric view of the cutter blade assembly and sensing mechanism, generally of the partial embodiment represented in FIG. 2.

At the other end of bed frame 12, a cutter blade assembly (or blade splitter means) 36 is mounted for limited vertical movement or adjustment at least for certain blades thereof. In all positions, at least some portion of assembly 36 remains in the path of movement of a log L driven by ram 18 so that a splitting operation is performed on a given log L as it is driven against the assembly. The cutter blade assembly may comprise at least one blade section, and preferably comprises four cutter blades 38, 40, 42, and 44 arranged perpendicular to each other, and situated radially relative to the center point or axis 46 of the assembly. As best shown in FIG. 3, blades 42 and 44 are arranged generally in a horizontal plane with the cutting edges thereof in common planar alignment. Blades 38 and 40 are instead generally arranged in a vertical plane.

The cutter blade 38 extends upwardly from central axis 46, while the cutter blade 40 extends downwardly from such axis. In the relative orientation of the cutter blades, upper blade 38 preferably has its cutting edge slightly offset, and situated rearwardly, from the cutting edge of lower cutter blade 40. As well, the cutting edges of the pair of generally horizontal cutter blades 42 and 44 are offset rearwardly of the cutting edge for such upper generally vertical cutter blade 38. With this preferred arrangement of the cutting edges (and assuming that a total of four so-spaced and oriented blades are used), during the resulting quartering of a log L by the blade assembly 36, the end of a log contacting the assembly and being driven thereinto is first cut by the cutting edge of blade 40 so as to commence splitting a lower portion of a log before reaching the cutting edge of upper blade 38, which is next encountered for continuing splitting of the log along a vertical line in the upper region of such log. Finally, the cutting edges of the pair of horizontal blades 42 and 44 are contacted so as to effect the commencement of splitting the log along a horizontal line. In this manner, the strain on hydraulic ram 18 and its power system is reduced. Thought of another way, the amount of ramming means force required for a given splitting operation is minimized, as compared with a situation where three or more blade sections simultaneously contact and cut into a given log L.

Further optional features of the structure of the cutter blade assembly or splitter means 36 are log separator wedges 50, which preferably form a part of upper vertical blade 38. The thickness of the horizontal blades 42 and 44 are preferably such as to provide their own log splitting function. Behind cutter blade assembly 36 (relative the driven direction of log movement), there is secured to bed frame 12 a back-up and guide member 54 which serves to generally maintain the blade assembly in a fixed position horizontally when a log is being split, whether halved (i.e., at least one appropriately positioned cutter blade being used) or quartered (i.e., all four cutter blades being used).

As variously shown in FIG. 3, blade assembly 36 (situated in a portion of the device 10 to which may be referred to as a log splitting station) is adapted to slide vertically along vertical edge 56 of back-up member 54, which functions for supporting or guiding the vertical movement of the blade assembly. This vertical movement of the blade assembly is facilitated by an opening 58 formed in the double-webbed I-beam 60 of bed frame 12, and permits various cutting operations of the log splitting apparatus and controlled or selected positioning of the blade assembly in accordance with the diameter of a log, as described below.

In one presently preferred manner of operation, a log L to-be-split is placed by an operator upon bed frame 12 (as represented in FIG. 1), and ram 18 is actuated for driving the log against blade assembly 36. As the log is so driven along its direction of movement established with bed frame 12, it first encounters the cutting edge of lower vertical blade section 40, then the cutting edge of upper vertical blade section 38, and lastly the combined cutting edges of the pair of horizontal blade sections 42 and 44. Continued movement of the log effects complete quartering thereof in the preferred arrangement illustrated in FIG. 1. Arrangements of fewer numbers of blade sections, such as only effecting halving of a given log, may be practiced in accordance with the present invention. If only halving is desired, it is particularly preferred that automatic sensing (i.e., indexing), and adjustment features of the invention be optionally practiced, as well.

As mentioned, the present invention may also be optionally provided with a sensing mechanism and other features for automatically raising and lowering blade assembly 36 in accordance with the sensed diameter of a given log L as it is moved in an established direction for engaging cutter assembly 36.

An exemplary present sensing mechanism, such as generally indicated by reference numeral 62 includes an index arm 64 pivotably mounted adjacent one end thereof to an extension arm 66, which may form part of back-up plate 54. A suitable pivot pin 68 may be removably positioned within holes formed in extension arm 66 and index arm 64. At the opposite end of index arm 64 which is at a distance from pivot pin 68, there is an index finger element 70 having a sensing wheel 72 or equivalent log contact (i.e., engagement) construction rotatably mounted at the lower end thereof, and pivotably supported by a pin 74 at such end of the index arm. One end of a coil spring 76 is attached at the other end of index finger element 70. The other end of spring 76 is connected to an adjustment member 75 supported on index arm 64 at a point therealong generally above the top edge of upper vertical cutter blade 38.

Figure 2:
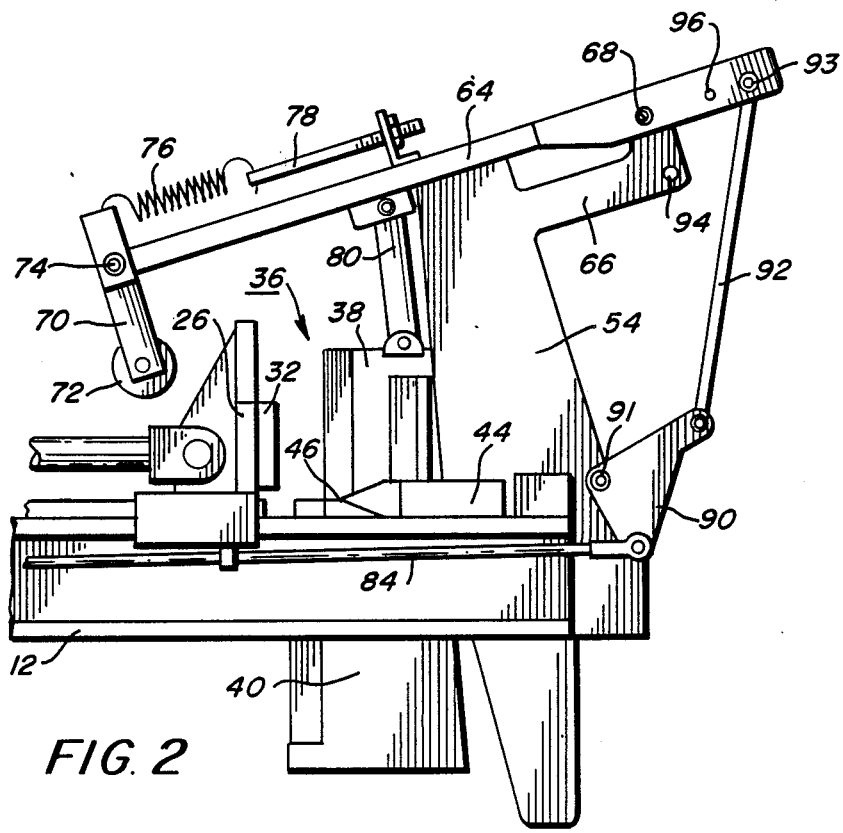
FIG. 2 is an enlarged, partial, side elevational view of, generally, an exemplary cutter blade assembly and sensing mechanism in accordance with certain aspects of the invention, positioned for one type of operation thereof.

The operation of such foregoing means for selectively raising and lowering blade assembly 36 responsive to the sensed log diameter is as follows. Upon clockwise rotation of index arm 64 about pivot pin 68, cutter blade assembly 36 is raised by virtue of link 80 being connected to arm 64 and blade 38, as shown in FIG. 2. Reverse or counterclockwise rotation of such arm by a mechanism to be described below will position index finger 70, such as shown in FIG. 1, for engaging the outer circumferential surface of log L to-be-next-split. Solid line illustration of indexing or sensing arm 64 and dotted line illustration 64' thereof, all in FIG. 1, represents exemplary indexed movement potential of such arm responsive to differential engagement of wheel 72 with different log outside diameters.

In such actuation, the index arm is rotated so as to position the blade assembly 36 such that central axis 46 thereof is generally in alignment with the central axis of a given log L to-be-next-split. With such an arrangement, the diameter of the log as sensed by such mechanism 62 will always and automatically result in positioning of the blade assembly 36 (of whatever type used) so that the log will be quartered or halved accurately (depending on the number of blade sections utilized with a given embodiment of this invention). It will be appreciated that logs of different sizes may be alternately applied to apparatus 10 without the need of operator intervention to reposition the cutter blade assembly to provide efficient quartering or halving of the log. With index finger 70 being spring-loaded, knots, lumps, or other uneven log surfaces are allowed to pass without damage to the system. Alternatively, certain embodiments of this invention, such as quartering blade arrangements, may be practiced without operation of, or presence of, such sensing and adjusting features.

Preferably, sensing mechanism 62 is normally in the dotted line position 64' illustrated in FIG. 1, with contact wheel 72 in an upright, raised position. In order to condition the sensing mechanism for log splitting operations, a lifting mechanism may be provided for moving sensing mechanism 62 from the position shown in FIG. 1 to one more suitable for the introduction of the log.

Such a lift mechanism may in the exemplary embodiment include a lift rod 84 having a threaded portion 85 at one end slidably received in an extension 86 secured to the horizontal base portion for pad member 26. An adjusting nut 88 is applied to threaded end 85 of rod 84 to permit adjustment of the longitudinal position of the rod relative to the axis of bed frame 12. The other end of lift rod 84 adjacent cutter blade assembly 36 is pivotably connected to a triangularshaped link element 90 pivotably supported by a pivot 91 on the lower edge of back-up plate 54.

Link element 90 is also pivotably connected at its distal end to a link rod 92, which has its other end pivotably connected to the end of index arm 64 which is opposite index finger 70, by a pivot pin 93 relatively adjacent pivot pin 68. Longitudinal movement of rod 84 in either direction by virtue of linkages 90 and 92 produces corresponding pivoting movement of index arm 64 about pivot pin 68. The positioning of rod 84 is set so as to selectively relate the position and movement of pad 26 with the pivoting of index arm 64. The adjusting nut 88 provides a means for producing such pivoting action and for ensuring proper timing therefor.

With hydraulic ram 18 inoperative and piston 20 in its fully retracted position, arm 64 is normally in the position in FIG. 1 shown in dotted line (64' thereof). This permits the operator to have clearance with respect to the positioning of a log L upon bed frame 12 preparatory to a log splitting operation. Adjusting nut 88 is set such that when the ram is retracted, during the last portion of travel (say for example, two inches of rearward travel), extension 88 engages the nut and moves the same and the rod rearward. Such action causes pivoting of link 90, clockwise rotation of arm 64 and the lifting of wheel 72 out of the way for placement of another log to be split.

Upon actuation of hydraulic ram 18 for extending same, horizontal element 30 is moved to the right, thereby allowing rod 84 to move axially to the right to produce slight pivoting movement of link 90 in a counterclockwise direction, as well as raising of rod link 92 upwardly to cause index arm 64 to rotate counterclockwise from the position 64' shown in dotted lines in FIG. 1. In this manner, index wheel 72 is selectively and desirably lowered into the path of movement of an advancing log for sensing the diameter of same. Continued motion of element 30 permits element 86 to slide upon rod 84.

Figure 4:
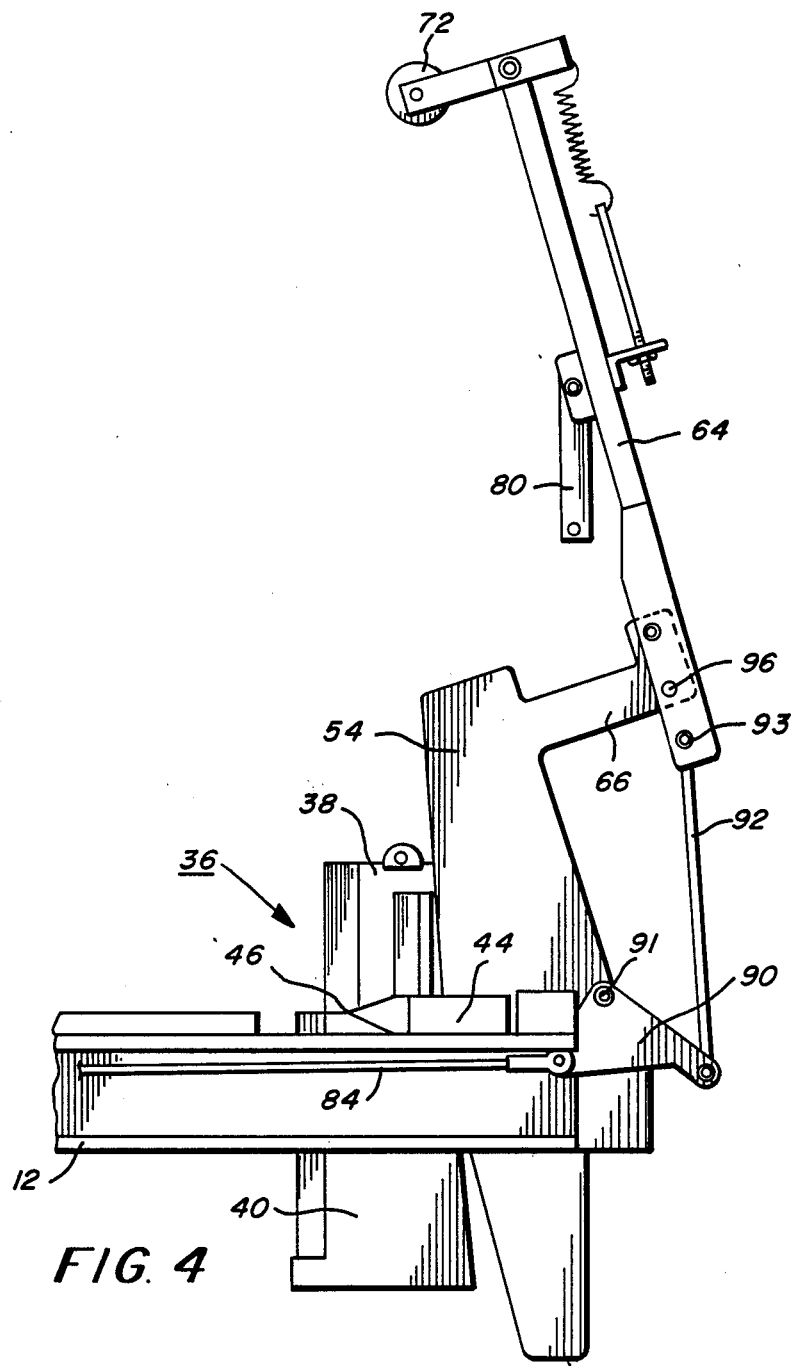
FIG. 4 is a partial, side elevational view of a present exemplary apparatus arranged for another form of operation thereof.

As has been mentioned, the present invention is also adapted to be used as a one-way splitter, that is, to split a log in half (or two pieces) rather than in quarters (or four pieces). For such use of apparatus 10, link 80 may be disconnected from upper vertical cutter blade 38, and pivot pin 68 is removed from its pivotal connection to arm 64 and extension 66 of back-up plate 54. Pin 68 is then inserted in an opening 94 formed in extension 66 and an opening 96 formed in arm 64 situated between the pivot pin location for pivot 68 and the pivot point for rod 92. Such deactivation means arrangement, representatively illustrated in FIG. 4, completely deactivates the sensing mechanism 62 and allows the blade assembly 36 to assume its lowermost position such as shown in FIG. 4. Per this arrangement, the log to-be-split does not engage the pair of horizontal cutter blades 42 and 44, but only engages the cutting edge of vertical blade 38. To reinstate the cutter blade assembly for quartering operation, the operator need only remove pivot pin 68 from the openings 94 and 96, and to reinsert the pin in the openings arranged for the quartering operation as aforesaid.

From the foregoing, it will be appreciated that the present invention significantly enhances and improves the capability of a log splitting device by permitting, in certain embodiments, automatic adjustment of the position of a cutter blade or entire blade assembly of the device, in accordance with the sensed diameter of the log to-be-next-cut. It will also be appreciated that, separately, a novel, multi-blade cutter assembly has been provided to permit quartering of logs during a single log feeding (i.e., driving) operation.

While the invention has been described with reference to the exemplary structure disclosed, it is not confined to such details set forth by way of example only, but is intended to cover such modifications or changes as may come within the scope of the appended claims. For example, other methods of sensing log diameters may be used for automatically actuating blade assembly position changes. Other variations may be practiced, without departing from the broader aspects of the following claims.

What is claimed is:

1. A log splitting apparatus, comprising:
   log bed means upon which logs to-be-split are supported for being moved therealong;
   power ramming means for driving a log along said log bed means toward a log splitting station to be split thereat;
   a sensing mechanism, situated adjacent said log splitting station, for sensing a log being driven towards said station and responsively assuming an indexed position in accordance with the sensed diameter of such log;
   a cutter blade assembly arranged at said log splitting station in the path of movement of a log for splitting such log as the same is driven against said cutter blade assembly by said power ramming means; and
   automatic blade adjustment means, associated with said sensing mechanism and said cutter blade assembly, for selectively positioning said cutter blade assembly relative said log bed means in accordance with said indexed position assumed for a given log, thereby automatically controlling the relative position of said cutter blade assembly in accordance with the sensed diameter of such given log.

2. A log splitting apparatus as in claim 1, wherein said cutter blade assembly includes at least one blade section, the position of which is movable in a plane generally perpendicular to the path of log movement, such that said automatic blade adjustment means positions said at least one blade section for substantially halving a given log based on the sensed diameter thereof.

3. A log splitting apparatus as in claim 1, wherein said cutter blade assembly includes four blade sections arranged generally perpendicular to each other, and positionable for substantially quartering a log with a single power ramming means operation.

4. A log splitting apparatus as in claim 3, wherein at least one of said blade sections is offset from the others thereof relative the path of log movement, so as to minimize the amount of ramming means force required for quartering a given log.

5. A log splitting apparatus as in claim 3, further including means for moving said cutter blade assembly so as to position only blade sections residing in a given plane into the path of movement of a given log, thereby effecting the splitting of such log in two pieces as said power ramming means operates.

6. A log splitting apparatus as in claim 5, further including means for temporarily deactivating said sensing mechanism and displacing same from said log splitting station whenever said cutter blade assembly is positioned for splitting logs into two pieces.

7. A log splitting apparatus as in claim 1, wherein said sensing mechanism comprises a wheel rotatably mounted on a finger element situated so as to selectively support said wheel generally in the path of a log to-be-split for sensing the diameter thereof.

8. A log splitting apparatus as in claim 1, wherein said cutter blade assembly includes a first pair of blades arranged generally in a horizontal orientation, and a second pair of blades arranged generally in a vertical orientation perpendicular to that of said first pair of blades, whereby a given log driven towards said cutter blade assembly centered thereon is substantially quartered thereby.

9. A log splitting apparatus, having a log bed upon which logs to-be-split are supported for movement in an established direction therealong, power ramming means for driving a log along said log bed and towards a log splitting station to be split thereat, and splitter means arranged at said log splitting station, for splitting logs driven theretowards by said power ramming means, wherein said splitter means includes:

one pair of splitting blade sections arranged generally in a horizontal orientation; and another pair of splitting blade sections arranged generally in a vertical orientation;

whereby logs being driven against said blade sections by said power ramming means are cut into four pieces;

and wherein said apparatus further includes means for sensing the diameter of a log to-be-split, and for automatically varying the position of at least one of said blade sections responsive to such sensed log diameter so as to result substantially in halving of such log when split at said log splitting station.

10. The log splitting apparatus as defined in claim 9, wherein said pair of generally vertical blade sections are offset one from the other along said established direction of log movement.

11. The log splitting apparatus as defined in claim 10, wherein at least one of said pair of generally horizontal blade sections is offset from at least one of said pair of generally vertical blade sections along said established direction of log movement.

12. The log splitting apparatus as defined in claim 9, wherein said means for sensing includes an engagement wheel situated relatively adjacent said log splitting station for engaging the outside diameter of logs driven thereto, and includes pivotable members linked thereto for being differentially pivoted by engagement of said wheel with different log diameters, resulting in adjustment of said at least one blade section position for substantial centering of said splitter means relative said log to-be-split and resulting quartering of such log.

13. A log splitting apparatus, comprising:

a log bed upon which logs to-be-split are supported:

a power ramming device for driving a log along said log bed and towards a log splitting station to be split thereat;

a cutter blade assembly situated at said log splitting station and having plural blade sections for cutting into four separate pieces a log driven thereagainst by said power ramming device; and adjustment means for automatically moving said cutter blade assembly so as to position said blade sections relative the path of movement of a given log, based on the sensed diameter of such given log, so as to effect splitting of such given log substantially in quarters.

14. An apparatus as in claim 13, wherein:

said cutter blade assembly includes a pair of generally horizontal blade sections and a pair of generally vertical blade sections; and said adjustment means includes a sensing wheel for engagement with the diameter of logs to-be-split, and mechanical linkages interconnected between said wheel and said cutter blade assembly for manipulating said blade sections responsive to differential engagement of said wheel with various diameter logs.

15. An apparatus as in claim 14, further including deactivation means for temporarily displacing said sensing wheel from the path of log movement while selectively moving said generally vertical blade sections away from the path of log movement such that at least one of the remaining generally horizontal blade sections is presented in the path of log movement for splitting a log into two separate pieces.

16. An apparatus as in claim 13, wherein at least certain of said blade sections are respectively staggered along the path of log movement so as to minimize the amount of power ramming device force required for quartering a given log.

\* \* \* \* \*